June 4, 1935.  A. E. SCHEIN  2,003,316
HIGH SPEED BEARING
Filed Jan. 13, 1932  2 Sheets-Sheet 1

INVENTOR
ALEXANDER E. SCHEIN.
BY
Herbert H. Thompson
his ATTORNEY.

June 4, 1935. A. E. SCHEIN 2,003,316
HIGH SPEED BEARING
Filed Jan. 13, 1932  2 Sheets-Sheet 2
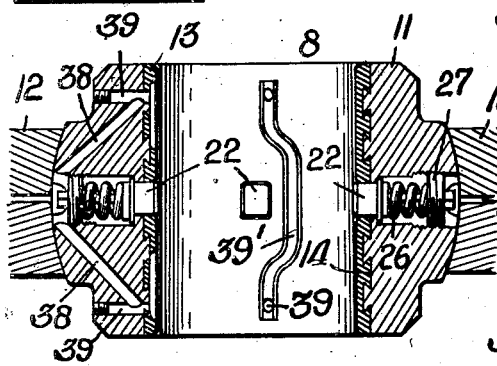
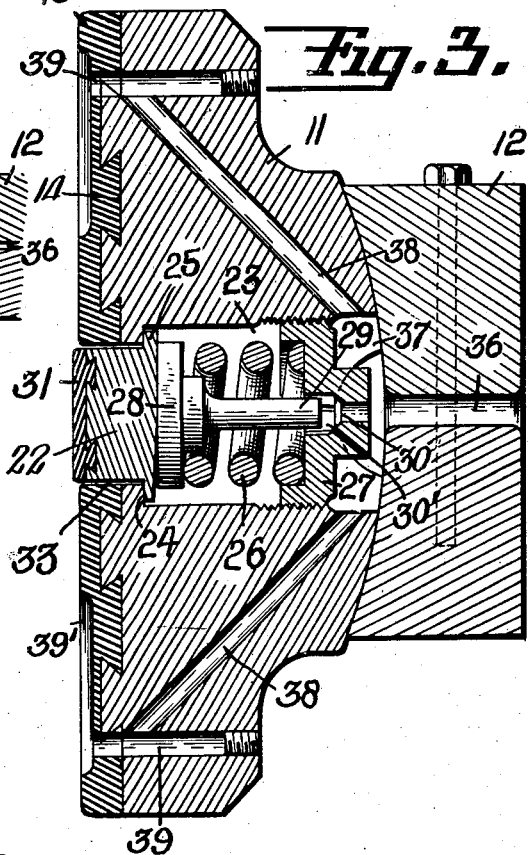
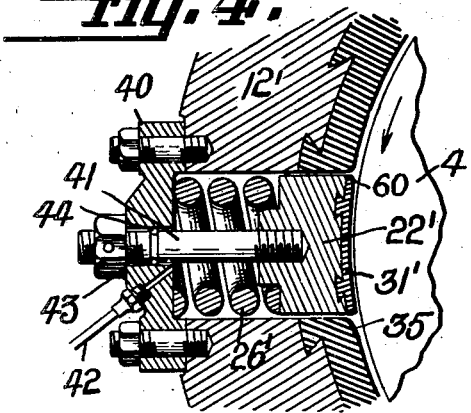
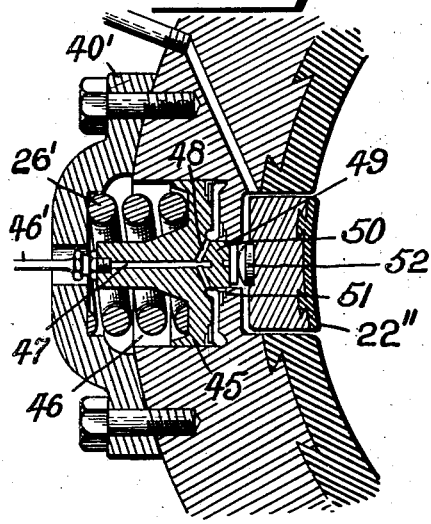
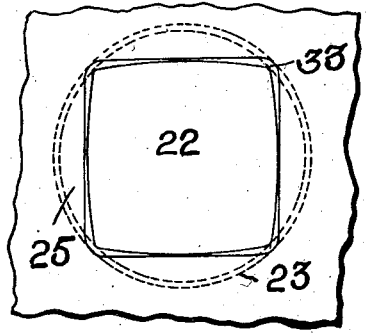
INVENTOR
ALEXANDER E. SCHEIN.
BY
ATTORNEY.

Patented June 4, 1935

2,003,316

UNITED STATES PATENT OFFICE 2,003,316

HIGH SPEED BEARING

Alexander E. Schein, New York, N. Y., assignor to Sperry Gyroscope Company, Inc., Brooklyn, N. Y., a corporation of New York Application January 13, 1932, Serial No. 586,256
In Great Britain December 19, 1931

9 Claims. (Cl. 308—73)

This invention relates to improvements in radial bearings for vertical shafts of heavy objects rotated at high speeds, such as the rotors of gyroscopic ship stabilizers or vertical turbine rotors, generators or the like, and more particularly to means for eliminating gyroscopic nutation and excessive vibration in such rotors. Even though the rotor of a stabilizer be carefully balanced and the bearing clearance made only sufficient for proper lubrication and cooling, it was found that excessive vibration of the rotor was likely to set in at high speeds. The object of this invention is to eliminate such vibration or gyroscopic nutation by a modification of the bearing structure.

In order to secure proper continuous lubrication of a shaft, especially a vertical shaft of a gyroscopic stabilizer in which the load is heavy and is continually changing in direction, it has been found necessary to make a substantial clearance between the shaft and the babbitt bearing in order to supply enough fresh oil both to lubricate and cool the bearing. Such clearance varies depending upon the diameter of the journal from .015″ to .024″ on each side of the shaft. If the rotor was perfectly balanced it would doubtless revolve without oscillation but in practice it is extremely difficult to obtain an absolutely perfect balance and even a very slight amount of unbalance, say an ounce or less in a rotor weighing many tons, may build up an oscillation or nutation which may reach dangerous proportions at high speed.

It was found also that such trouble was partly due to lack of close union between the babbitted bearing and the shell. In other words, when the babbitt is molded in place within the shell, its coefficient of expansion and contraction is greater than that of the shell so that in cooling it tends to pull away from the shell leaving a dead space therebetween. This permits an extra play of the rotor shaft which becomes worse as the babbitt wears.

To remedy such defects, I propose in my invention to provide, to supplement the main radial bearings, auxiliary relatively small bearing blocks having practically no clearance when running with an oil film, and yieldingly holding such auxiliary blocks in place so that under normal conditions said blocks hug the shaft closely and prevent the setting up of nutation. When the main bearing load is directed toward any auxiliary block, however, it yields and permits the load to be taken by the main bearing.

As a further remedy I propose to prevent the occurrence of dead space between the babbitt lining and the shell by expanding the babbitt after it is cooled by hydraulic pressure within the bearing which is of sufficient magnitude to force the babbitt outwardly into intimate contact with the shell at all points. By this process not only is the dead space eliminated and the working of the babbitt lining prevented but the strength of the babbitt is increased by placing it under this large strain.

Referring to the drawings showing several preferred forms of my invention,

Fig. 2 is a section through the same bearing on a larger scale.

Fig. 3 is a similar section on a still larger scale, showing the exact construction of the auxiliary block.

Fig. 4 is a sectional view taken at right angles to Figs. 2 and 3 and showing a somewhat different form of bearing block.

Fig. 5 is a similar view showing a still different form of bearing block in which hydraulic pressure may be used to lift the block when starting the gyroscope.

Fig. 6 is a face view of one of the auxiliary bearing blocks showing the clearance provided in the main bearing for the same.

Figure 1:
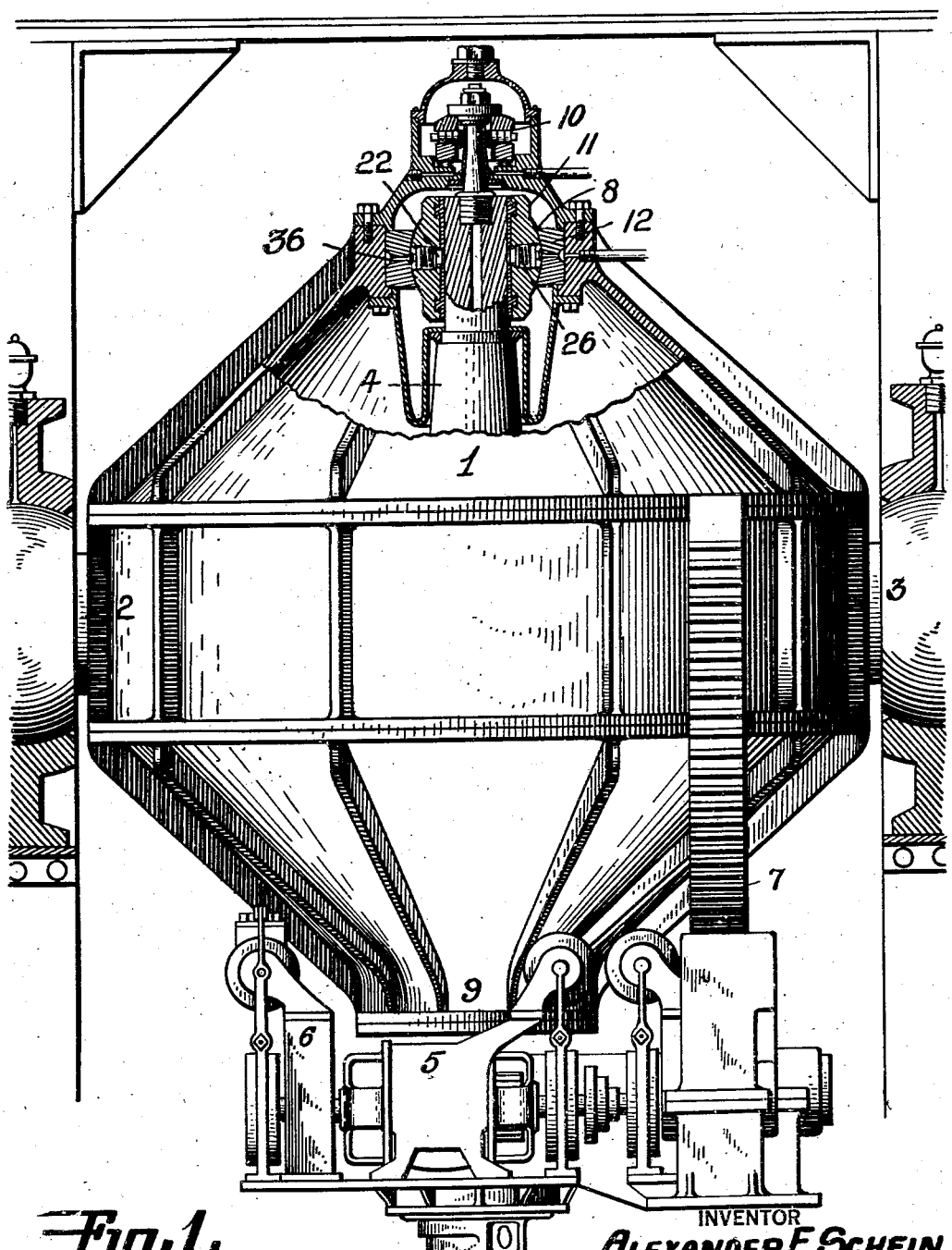
Fig. 1 is a side elevation of a vertical shaft gyro-stabilizer showing one of the bearings in section.

While my invention is applicable to the bearings of any high speed rotor, it has especial adaptation to vertical shaft bearings and to the vertical shafts of gyroscopic rotors. Fig. 1 is intended to represent a ship stabilizing gyroscope of large size, the gyro casing 1 being mounted for oscillation in trunnions 2 and 3 on the ship. The rotor proper lies normally in a horizontal place, i. e., a plane perpendicular to the paper. The shaft 4 thereof normally is vertical but when the gyro precesses the shaft turns with the gyroscope in the fore and aft plane of the ship through an angle of some 60° on the side. The gyroscope is controlled through the usual precession motor 5 and brake 6 which operate through a larger gear sector 7 on the gyro casing. The rotor shaft is journalled at both upper and lower ends in radial bearings 8 and 9, the upper bearing only being shown in section. The rotor in this instance is suspended from the top on thrust antifriction bearing 10 but the main precession load is taken by the guide or radial bearings 8 and 9.

Figs. 2 and 3 show a cross section of one of these bearings on a larger scale than Fig. 1. The bearing shell 11 is universally supported in the outer ring 12 of the bearing in the usual manner and the shell is bored out to a diameter sufficient to receive the babbitt lining 13 and is preferably grooved as at 14. Said babbitt is molded or cast in the shell while hot, the babbitt flowing into grooves 14 to hold the babbitt lining in place.

According to my invention, I provide auxiliary bearing blocks 22 of comparatively small area and situated preferably symmetrically around the bearing. The blocks I preferably locate near the center of the bearing by boring holes 23 through the shell 11 and through the babbitt lining. Said holes are of larger diameter at the upper portion so as to provide an annular shoulder 24 near the bottom thereof. Each block 22 is provided with a cooperating annular shoulder 25. The block is normally held with the shoulders butting by means of a strong compression spring 26 which bears at one end against threaded adjustable collar 27 and at the other end against the base 28 of a guide pin 29, the stem of which is encircled by the spring and is guided at its upper end in grooved hole 30 in the sleeve 27. The face of said block is covered with babbitt 31 which may be made thinner than the babbitt on the main bearing.

In its normal position the face of said block lies much closer to the shaft than the main babbitt. I found through many experiments, if attempt is made to reduce the clearance of the main bearing to oil film dimensions, that the bearing will over-heat and burn up due to an insufficient supply of oil for cooling as well as lubrication. Therefore, I have found it necessary to make the clearance of the main bearing on the order of .038" or .019" on the side for a diameter of 18". On the other hand, I may safely position the auxiliary blocks to within oil film thickness of the shaft (.002") so that when the bearing is running there is no clearance between the blocks and shaft and shaft, the surfaces being separated by the oil film so that the shaft is held practically rigid. On the other hand when the main bearing load, as it shifts from side to side with the precession of the gyroscope, reaches a portion of the bearing containing any one bearing block, the spring 26 yields so that the main load is taken by the main bearing. The need for fairly large clearance in this type of bearing is fully set forth in my prior Patents No. 1,662,903 and No. 1,682,189, and this invention is especially applicable to this type of bearing wherein the babbitt is bored out from eccentrically located centers to form a plurality of quadrants of equal radii of curvature. In such case an auxiliary block is preferably located in the center of each quadrant.

Preferably the block 22 is given a loose fit in the lower portion 33 of the aperture (see Fig. 6), the block being rounded off at the edges so that it may rock or turn slightly in any direction. Preferably also it is beveled off at the back where engaged by the base 28 so that the block may tilt slightly toward the direction of rotation of the shaft in order to assist the building up of an oil film thereunder. In addition to or instead of this construction the "on" side of the babbitt on the block 22' may be beveled off slightly as shown in exaggerated form in Figs. 4 and 5 at 60 for the same purpose and the main babbitt lining may be also beveled off at the corner 35 beyond the block.

In order to insure lubrication of the block, oil to the bearing is shown as entering through the hole 36 in the bearing shell (Fig. 3) into the chamber 37 from whence it passes not only through inclined bores 38 to the oil holes 39 connected to grooves 39' across the face of the bearing but also through the hole 30 in the sleeve 27 and down past stem 29 through grooves 30' and thence through the clearance between the block and the shell and babbitt.

Fig. 4 shows a slightly modified form of design for the blocks in which the back plate 40 of the spring is bolted to the outside of the bearing shell 12' and the bearing block 22' is threaded on the inner end of a bolt 41 passing through the block 40. Oil is shown as entering above the block through the pipe 42. Sufficient play may be allowed between the bolt and the aperture 43 to permit the block to align itself properly with the shaft, a gland 44 being shown to prevent the escape.

Fig. 5 shows a still further modification in which hydraulic pressure may be used to withdraw the blocks in starting up so as to relieve the rotor shaft of this additional load until the oil films are properly built up. As shown, the compression spring 26' in this instance bears at one end against a back plate 40' bolted to the bearing shell and at the other end against the upper face of a piston 45 fitted within a bore 46 in the shell. Hydraulic pressure may be admitted to the back of the piston as by means of a flexible pipe 46' connected to a bore 47 extending through the stem of the piston and connected with a radial bore or bores 48 leading back of the piston. The piston is also provided with a guide boss or short piston rod 49 slidably fitted within a reduced aperture 50 in the shell and provided with suitable packing 51 to prevent the escape of the water, oil, or other liquid used to furnish the hydraulic pressure. At its lower end said boss bears against a rounded block 52 in the top of the bearing block 22". The block is thus normally held in its outermost position by the spring and may tilt slightly in any direction to accommodate itself to the oil film conditions. In starting up, however, hydraulic pressure may be supplied to relieve the block of the downward thrust from the spring 26' thus permitting it to push backwardly and exert little or no pressure on the shaft when starting. No limiting shoulders are needed in this form, therefore, since after the shaft is rotating the oil film will maintain the proper clearance and before rotation is under way all pressure on the block is relieved.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. As a means for preventing vibration of high speed vertical shaft rotors, the combination with the main rotor bearings, of auxiliary bearing blocks positioned symmetrically around said shaft, each block having a clearance between said block and said shaft which is less than permissible in the main bearings, and yielding means for permitting said blocks to retreat to the surface of the main bearing under more than a predetermined load.

2. As a means for preventing vibration of high speed vertical shaft rotors, the combination with the main rotor bearings, of auxiliary bearing blocks spaced symmetrically around the bearing surface with a clearance between said block and the rotor shaft less than is permissible in the main bearings, and spring means for permitting said blocks to retreat to the surface of the main bearing under more than a predetermined load.

3. A bearing for high speed rotors comprising a shell having a babbitted lining and an aperture through said shell and lining, a babbitted block slidably mounted in said aperture and normally adapted to project slightly beyond the main bearing but not to contact with the rotor shaft in the absence of an oil film, and spring means permitting said blocks to yield when the main load reaches that part of the bearing.

4. A bearing for high speed rotors comprising a shell having a babbitted lining and an aperture through said shell and lining, a babbitted block slidably mounted in said aperture and normally adapted to project slightly beyond the main bearing, spring means for holding said blocks yieldingly in position, and a tilt permitting connection between said spring and block.

5. As a means for preventing vibration of high speed rotors, the combination with the main rotor bearings, of auxiliary bearing blocks positioned with a clearance between said block and the rotor shaft less than is permissible in the main bearings, means for supplying oil directly to the surface of said blocks, and yielding means for permitting said blocks to retreat to the surface of the main bearing under more than a predetermined load.

6. A bearing for high speed rotors comprising a shell having a babbitted lining and an aperture through said shell and lining, a babbitted block slidably mounted in said aperture and normally adapted to project beyond the main bearing, spring means permitting said block to yield when the main load reaches that part of the bearing, and means controllable at will for temporarily rendering said spring means ineffective and holding said block off the shaft when starting the rotor.

7. As a means for preventing vibration of high speed rotors, the combination with the main rotor bearings, of auxiliary bearing blocks movably mounted in said main bearings, spring means for normally holding said blocks against the oil film around the shaft, and hydraulic means adapted to be brought into action during starting to take the pressure of said spring means off the blocks.

8. As a means for preventing vibration of high speed rotors, the combination with the main rotor bearings, of auxiliary bearing blocks positioned with less clearance between said block and the rotor shaft than permissible in the main bearings, yielding means for permitting said blocks to retreat to the surface of the main bearing under more than a predetermined load, and means for supplying oil directly to the surface of each block.

9. As a means for preventing vibration of high speed rotors, the combination with the main rotor bearings, of auxiliary bearing blocks movably mounted in said main bearings, spring means for normally holding said blocks against the oil film around the shaft, and stop means for maintaining a clearance between said blocks and the rotor shaft in the absence of an oil film.

ALEXANDER E. SCHEIN.